Patented Nov. 25, 1952

2,619,181

UNITED STATES PATENT OFFICE 2,619,181

LOW WATER-LOSS CEMENT SLURRY

Peggy J. Lea, Kansas City, Mo., and Henry B. Fisher, Bartlesville, Okla., assignors to Phillips Petroleum Company, a corporation of Delaware No Drawing. Application July 11, 1949, Serial No. 104,153

5 Claims. (Cl. 166—22)

This invention relates to low water-loss cement slurries. In one specific aspect it relates to low water-loss cement slurries comprising hydraulic cement, such as Portland cement, with or without non-cementing inert granular aggregate material, which hydraulic cement may or may not contain the usual minor additives common to hydraulic cements such as calcium sulfate and/or calcium chloride as an example in amounts up to 3% to retard the time of set, a small but effective amount of inulin, and sufficient water to make a slurry.

In the art of cementing oil wells and in grouting cracks in masonry structures there is a tendency for the cement slurry to lose water at such an extent that it becomes dehydrated, set, or cracked prematurely, with the result that it cannot be properly placed in position due to an increase in viscosity of the slurry, and resulting increases in force necessary to pump or move the slurry into position. This deleterious dehydration is increased in many oil wells by the modern practice of scratching, or scraping the drilling mud from the wall of the well by mechanical means prior to placing the cement, which often exposes porous formations which will absorb the water from the slurry. This is particularly important when oil sands are penetrated, as artificial contamination of oil sands with water will often cause shaley impurities in the sand to swell and reduce the permeability of said oil sand to a very great extent. Therefore water lost from the slurry tends to seal off the formation to oil flow. When it is intended to cement with slurry, and then gun perforate the hardened slurry, the gun perforator may not be able to penetrate into the formation beyond the slurry to a sufficient depth to penetrate into the region beyond that in which the shaley impurities are swollen by the water extracted by the formation from the slurry. In such cases the oil production rate of the well may be severely reduced by water contamination from the slurry.

We have found that by adding a small but effective amount of inulin in the amount of 1% based on the weight of dry cement and preferably using ordinary commercial Portland cement containing the usual additives, along with sufficient water to make a slurry, that the water loss as determined by filtration tests is greatly reduced and contamination of the formation is substantially prevented.

One object of the present invention is to provide an improved low water-loss cement slurry useful in grouting in general, in cementing the walls of wells, and for cementing pipe in wells.

Another object is to provide a low water-loss cement which will not contaminate the earth formations in bore holes with water to any substantial extent.

Another object is to provide a cement slurry suitable for use in oil well cementing operations.

Numerous other objects and advantages will be apparent upon reading the accompanying specification and claims.

In preparing the slurry the dry ingredients comprising hydraulic cement, with or without additives for increasing the time of set, the inert filler material, such as sand or crushed limestone, and the inulin, may be mixed together and later mixed with water, or any of them may be mixed separately with hot or cold water, and then mixed together to form the cement slurry, as long as the mixing of the hydraulic cement with water is done promptly before placing the slurry in position.

By hydraulic cement we intend to include all mixtures of lime, silica, and alumina, or of lime and magnesia, silica, and alumina and iron oxide (magnesia for example may replace part of the lime, and iron oxide a part of the alumina) as are commonly known as hydraulic cements. Hydraulic cements include hydraulic limes, grappier cements, puzzalan cements, natural cements, and Portland cements. Puzzalan cements include slag cements made from slaked lime and granulated blast furnace slag. Because of its superior strength Portland cement is preferred among the hydraulic cements, but as the art of cements recognizes hydraulic cements as a definite class, and as results of value may be obtained with any member of that class, it is desired to claim all hydraulic cements.

In most oil well cementing and grouting operations it is generally desirable to use neat cement for added strength, but obviously it is always possible to add any desired amount of an inert granular filling material or aggregate such as sand, ground limestone, or any of the other well known inert aggregates, as long as the amount added does not reduce the strength below the desired value. In operations in open wells it is often desirable to use neat cement, because inert filling material will automatically become detached from the walls of the well, and will tend to mix with and dilute the slurry to such an extent that it is undesirable to add any filling material to the slurry being forced into the well.

The amount of water added is not critical, it being obvious that sufficient water should be added to form a pumpable slurry, and that when the slurry becomes pumpable no further water need be added. One advantage of the slurry of the present invention is that it is a low water-loss slurry, and therefore it is not necessary to add excess water over the amount making the slurry pumpable as a reserve for expected losses, which would tend to reduce the strength of the cement.

In order to reduce the water loss of the cement slurry we add a small but effective amount of inulin.

Inulin is also called alantin, alant starch, sinistrin, menyanthin, or dahlin, and consists of a white, hygroscopic, starch-like carbohydrate the formula of which is possibly $(C_6H_{10}O_5)_x$ where C is carbon, H hydrogen, O oxygen and $x$ is an integer of the order of about 100. It melts and decomposes about 160° C.

Inulin sources are dahlias, Jerusalem artichokes, chickory, dandelions, burdock roots, golden rod roots and camas roots. Its prior art use is mainly making diabetic bread. The inulin used was chemically pure inulin purchased from the Tennessee Eastman Co., but obviously commercial grades will give valuble or equivalent results in cement slurries.

We have found that from 0.1% to 3% of inulin is particularly effective in reducing the water loss of hydraulic cement aqueous slurries, without or with inert filling material present.

A Portland cement slurry was made up with fifteen pounds of cement to the gallon of slurry, and 1% of inulin by weight (based on the dry Portland cement) was added to one-half of the sample. The two halves of the sample were tested separately according to the test procedure for drilling muds described in A. P. I. code 29 and the sample which had no additive lost 105 cc. of water in one minute and 15 seconds through the standard filter paper at 100 p. s. i., whereas under the exact same conditions the half of the sample containing the inulin only lost 110 cc. of water in 11 minutes, 20 seconds. Obviously, the portion of the sample without the additive would lose water to the formation of a well to such an extent that it would dehydrate and have a premature setting, or bridging effect, which would increase the pressure needed to place the slurry to a degree making the operation inoperative in many wells having porous formations, and the water from the slurry would contaminate such formations, whereas the portion of the sample containing the additive would not readily give up water to such a formation, and would remain easily pumpable into place during the usual period of exposure to such a formation.

The cement slurry used in these tests was composed of 53 grams of water per 100 grams of cement to give a cement slurry containing approximately 15 pounds of cement per gallon. The cement slurry set into a hard cement suitable for use in well cementing and grouting after the water-loss test described above when it contained the effective amount of water-loss reducing additive, but the same cement slurry without the additive set in a cracked and weakened condition after said above mentioned water-loss test due to water lost in said test.

It is also obvious that inert filling material will not substantially affect the result of this test, when used in an amount not large enough to deleteriously reduce the strength of the cement slurry after setting.

The above example and tests are given for illustrative purposes and should not be regarded as limiting the invention, the scope of which is set forth in the following claims.

Having described our invention, we claim:

1. A cement capable of forming a fluid slurry when mixed with water, said cement comprising a hydraulic cement mixed with from 0.1% to 3% by weight of dry cement of inulin.

2. A cement capable of forming a fluid slurry when mixed with water, said cement comprising Portland cement mixed with from 0.1% to 3% by weight of dry cement of inulin.

3. A hydraulic cement slurry comprising a hydraulic cement, water, and from 0.1% to 3% by weight of dry cement of inulin.

4. A hydraulic cement slurry comprising Portland cement, water, and from 0.1% to 3% by weight of dry cement of inulin.

5. The process of cementing a well which extends into a porous formation which comprises placing a hydraulic cement aqueous slurry having a reduced water loss adjacent to said porous formation by admixing with hydraulic cement from 0.1 per cent to 3 per cent by weight of the dry cement of inulin, interacting therewith sufficient water to produce a fluid slurry and introducing said slurry into said well into contact with said porous formation.

PEGGY J. LEA.
HENRY B. FISHER.

REFERENCES CITED

The following references are of record in the file of this patent:

UNITED STATES PATENTS

| Number | Name | Date |
| --- | --- | --- |
| 2,006,426 | Weiler | July 2, 1935 |
| 2,374,628 | Swayze | Apr. 25, 1945 |
| 2,429,211 | Andes | Oct. 21, 1947 |
| 2,470,505 | Ludwig | May 17, 1949 |
| 2,489,793 | Ludwig | Nov. 29, 1949 |

OTHER REFERENCES

Armstrong, "The Carbohydrates and the Glucosides," pages 168, 169 (1924).

Mackenzie, "The Sugars and Their Simple Derivatives," pages 180, 181 (1931).